Patented July 5, 1949

2,475,564

UNITED STATES PATENT OFFICE 2,475,564

CATALYTIC ACYLATION OF PHENYL ALKYL ETHERS

Howard D. Hartough, Pitman, N. J., and Alvin I. Kosak, Columbus, Ohio, assignors to Socony-Vacuum Oil Company, Incorporated, a corporation of New York No Drawing. Application June 12, 1946, Serial No. 676,335

12 Claims. (Cl. 260—592)

This invention relates to a process for the acylation of aromatic alkoxy compounds and, more particularly, is directed to a method for acylating aromatic alkyl ethers in the presence of an acidic catalyst comprising a sulfur, phosphorus, or fluorine containing hydroxy acid.

The acylation of aromatic alkoxy compounds, such as the phenyl alkyl ethers has heretofore been carried out in the presence of a Friedel-Crafts type catalyst, principally aluminum chloride. While, in some instances, a relatively high yield of product has been obtained employing such catalyst, the acylation process has not been altogether free of operational difficulties. Thus, it has been found necessary to use at least a molecular equivalent amount of aluminum chloride catalyst per mole of acylating agent employed in order to effectively promote the acylation reaction. When aromatic alkoxy compounds are heated with such relatively large amounts of aluminum chloride, there is a tendency for cleavage to occur in the alkoxy group with formation of the corresponding phenol. This reaction has, in fact, been employed in some instances to dealkylate aromatic alkoxy compounds. However, where it is desired to obtain as a final product an acylated alkoxy aromatic, the above-mentioned cleavage is definitely undesirable. It has accordingly been necessary, using an aluminum chloride catalyst in the acylation process, to work at low temperatures or to reduce the time of contact of the alkoxy compound with the catalyst in order to minimize cleavage in the alkoxy side chain.

Acylation of aromatic alkoxy compounds in the presence of the required relatively large amounts of aluminum chloride has been further complicated by the formation of complexes between aluminum chloride and certain of the phenyl alkyl ethers, such as anisole. The formation of said complexes tends to reduce the yield of desired product. Heretofore, in order to obtain a substantial yield of acylated product when an aluminum chloride catalyst was used, it has been necessary to carry out the reaction in the presence of a diluent or solvent material, such as petroleum ether or carbon disulfide, to effectively reduce the tendency toward formation of undesirable resinous by-products, believed to be due primarily to the aforesaid complexes.

It has now been discovered that acylated aromatic alkoxy compounds may be obtained in an efficient manner by reacting the aromatic alkoxy compound to be treated with an acylating agent in the presence of a catalyst comprising a strong hydroxy acid containing phosphorus, sulfur, or fluorine.

It has been found that by using, as an acylating catalyst, a hydroxy acid of one or more of these elements, the above mentioned difficulties encountered in the acylation of aromatic alkoxy compounds have largely been overcome. Thus, by employing a catalyst comprising a strong hydroxy acid of sulfur, phosphorus or fluorine, the tendency of cleavage of the alkoxy group to occur is substantially reduced so that the acylation reaction can be carried out in a direct manner without a detailed observance of experimental conditions, particularly maintenance of a low temperature and short residence time such as is a necessary precaution to be taken when aluminum chloride is employed as catalyst. It has been found that strong hydroxy acid catalysts effect the acylation of aromatic alkoxy compounds without accompanying formation of complex addition products and that accordingly the necessity of using a diluent or solvent material such as has heretofore been necessary to obtain a substantial yield of desired product may be eliminated. It would appear that the advantages obtained using a strong hydroxy acid can be attributed, at least in part, to the fact that relatively small quantities of acid can be used as effective catalysts in the acylation of aromatic alkoxy compounds. Hence, in addition to affording a high yield of desired product, the present process affords a more economical and efficient catalytic method for the acylation of aromatic alkoxy compounds than has been used heretofore.

It is accordingly an object of the present invention to provide an efficient process for synthesizing acylated aromatic alkoxy compounds. Another object is to provide a process for catalytically acylating said compounds. A still further object is to afford a process for catalytically acylating aromatic alkoxy compounds in the presence of an inexpensive, easily obtainable catalyst. A very important object is to provide a process capable of reacting aromatic alkoxy compounds with an acylating agent in the presence of small amounts of a catalyst without undue formation of addition complexes between catalyst and said compounds and, further, without the tendency of a cleavage to occur during acylation in the alkoxy group of said compounds leading to formation of the corresponding phenol.

These and other objects which will be recognized by those skilled in the art are attained in accordance with the present invention, wherein aromatic alkoxy compounds are acylated by reaction with organic carboxylic acid anhydrides or acyl halides in the presence of a strong hydroxy acid containing sulfur, phosphorus, or fluorine.

The catalysts in question are strong acids containing at least one hydroxy group in the molecule, such as phosphoric acid and sulfuric acid. While the mechanism of the acylation reaction is not definitely known, it has been noted that strong acids, such a hydrochloric acid, which do not contain hydroxy groups, are ineffective as catalysts. Likewise, weak acids containing hydroxy groups, such as boric acid, fail to catalytically promote the acylation of aromatic alkoxy compounds. Representative of the acidic catalysts contemplated for use in this invention are the hydroxy acids of sulfur and phosphorus, and the fluorine-containing acids which have one or more hydroxy groups, such as fluophosphoric and the hydroxy fluoboric acids. In general, acids of the above type having an ionization constant greater than $1.0 \times 10^{-2}$ for the first hydrogen atom are employed as catalysts in the process of this invention.

Aromatic alkoxy compounds, in general, may be acylated by the method of this invention. These compounds comprise an aromatic group and an alkyl group joined by an ether linkage through an oxygen atom. The aromatic group so joined may be, for example, a phenyl, naphthyl or anthryl group or a substituted derivative thereof, such as tolyl, chlor-naphthyl, bromanthryl and the like. The alkyl group may be a saturated or unsaturated radical, such as methyl, ethyl, benzyl, crotonyl, etc. The aromatic alkoxy compounds contemplated in this invention also include aromatic groups having attached thereto two or more alkoxy groups. Representative of the latter compounds are the dimethoxy benzenes, such as the dimethyl ether of catechol, resorcinol, and pyrogallol; the diethoxy benzenes; the dimethoxy naphthalenes; the diethoxy naphthalenes; dimethoxy anthracenes; the diethoxy anthracenes, etc. Veratrole (1,2, dimethoxy benzene) is a typical dialkyl ether which can be acylated in accordance with the present invention. The resulting acyl derivative can be easily converted into veratric acid, thus providing an efficient method for making this compound. Likewise, the synthesis of p-acetylanisole, in accordance with the present invention, provides a relatively inexpensive means for making p-anisic acid therefrom by the haloform reaction. In a similar manner, other heretofore relatively expensive and difficultly obtainable compounds of interest to the drug industry might also be prepared from the acylated aromatic alkoxy compounds of this invention.

The acylating agents to be used herein may be an acyl halide or an organic carboxylic acid anhydride. Included in the latter category are those compounds having the basic structure

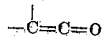

which, upon addition of water, yield organic carboxylic acids. These acylating agents may be derived by methods well known to the art from mono- or polybasic organic acids which may be either unsaturated or saturated. Thus, representative acylating agents to be used in this invention include the anhydrides of saturated fatty acids, such as acetic anhydride, propionic anhydride, ketene, etc.; the acyl halides of saturated fatty acids, such as acetyl chloride, stearoyl chloride, etc.; the acyl halides of dibasic acids, such as phthalyl chloride; the acyl halides of dibasic acids, such as phthalyl chloride; the acyl halides of aromatic acids, such as benzoyl chloride; the anhydrides of unsaturated acids, such as crotonic anhydride; and the acyl halides of unsaturated acids, such as crotonyl chloride. These acylating agents are given merely by way of examples and are not to be construed as limiting, since other acyl halides or anhydrides of carboxylic acids which will readily suggest themselves to those skilled in the art may likewise be used.

The acylation of aromatic alkoxy compounds may be carried out employing equimolar quantities of said compound and acylating agent. However, in general, the presence of an excess of acylating agent has been found to give preferable results.

The reaction rate is largely a function of the temperature increasing with increasing temperature, the upper limit of temperature being dependent on the boiling point of the reactant at the specific pressure of the reaction. In general, temperatures of between about 0° C. and about 150° C. and pressures of between atmospheric and about 10 atmospheres have been found satisfactory for effecting the acylation reaction. The effect of increased pressure, theoretically, is toward increased relation but, from a practical standpoint, this is not a very great effect with reactions such as those involved herein which go readily at normal pressures. The temperature to be employed will depend on the time of reaction and the nature of the acylating agent used. Ordinarily, a pressure sufficient to maintain the reactants in the liquid phase is employed and this is more or less dependent upon the particular temperature involved. As a general rule, the higher the temperature, the higher the pressure and the lower the reaction time that is needed. It is, of course, to be understood that these reaction variables are more or less interdependent. Under the conditions encountered in the process of this invention, however, the reaction period will generally vary from about 1 to about 10 hours.

The strong hydroxy acids containing sulfur, phosphorus, or fluorine employed herein as catalysts may be either organic or inorganic acids containing one or more of these elements. The inorganic acids, however, generally having higher dissociation constants and being more readily obtainable will usually be used. The sulfur, phosphorus, or fluorine-containing acids having one or more hydroxy groups present may be employed in amounts as little as 0.1 per cent by weight of the reactants. However, amounts varying between about 1 and about 10 per cent by weight are preferable. Representative acids contemplated for use herein as catalysts include strong hydroxy acids of phosphorus, such as phosphoric and phosphorus acids; strong hydroxy acids of sulfur, such as sulfuric and the sulfonic acids, including the toluene sulfonic acids; strong hydroxy acids containing fluorine, such as fluosulfonic acid, dihydroxy-fluoboric acid, and fluophosphoric acid. Other hydroxy acids of fluorine, sulfur, or phosphorus having relatively high dissociation constants, that is, generally greater than $1.0 \times 10^{-2}$ for the first hydrogen atom, are likewise contemplated for use as catalysts in the acylation of aromatic alkoxy compounds. Hence, the above representative list of suitable catalysts is not to be considered as limiting. An essential feature of the present invention is that the catalyst be a strong hydroxy containing acid of phosphorus, fluorine, or sulfur. Strong hydroxy acids not containing one of these elements, such as picric acid, and weak hydroxy acids, such as boric acid, did not exhibit any catalytic activity as acylation catalysts. Likewise, strong inorganic acids, such as hydrochloric, hydrofluoric and hydrobromic acids, which do not contain hydroxy groups were also devoid of any catalytic effect.

The process of this invention accordingly comprises mixing an aromatic alkoxy compound, an acylating agent, and a catalyst comprising a strong hydroxy acid of phosphorus, sulfur, or fluorine, heating the resulting mixture at a suitable temperature for a sufficient period of time to effect the acylation of the aromatic alkoxy compound and removing the desired acylated product therefrom. The catalyst will preferably be added to the mixture of reactants in substantially pure form or as a highly concentrated aqueous solution. The use of more dilute solutions, in general, requires a greater addition of carboxylic acid anhydride to remove the water. The concentration and volume of acid employed should preferably be such that the acid is present in the reaction mixture in amounts of from about 0.1 to about 10 per cent by weight of the reactants.

The following detailed examples are for the purpose of illustrating modes of effecting the acylation of aromatic alkoxy compounds in accordance with the process of this invention. It is to be clearly understood that this invention is not to be considered as limited to the specific acylating agents disclosed hereinafter or to the particular conditions set forth in the examples.

Example 1

To a mixture of 54 grams (0.5 mole) of anisole and 107 grams (1 mole) of 95 per cent acetic anhydride were added 10 grams of 85 per cent phosphoric acid (ortho). The reaction mixture was heated at a temperature of 120–130° C. for 3 hours. At the end of this time, the mixture was cooled and 200 milliliters of water were added. The mixture was then extracted three times with 100 milliliters of chloroform. The chloroform layer was then separated, water-washed and finally washed with aqueous sodium carbonate solution to assure complete removal of the acid. Distillation of the chloroform solvent under reduced pressure yielded 42 grams of p-acetylanisole having a boiling point of 114–121° C. at a pressure of 8 millimeters. This amount represents a conversion of 63 per cent based on the quantity of anisole consumed. Six grams of anisole, which could be recycled for further acylation, were recovered.

Example 2

To a mixture of 108 grams (1 mole) of anisole and 140 grams (1 mole) of benzoyl chloride were added 5 grams of 85 per cent phosphoric acid (ortho). The mixture was heated at a temperature of from 100–105° C. for 6 hours. At the end of this time, the mixture was cooled and thoroughly washed with dilute aqueous sodium hydroxide solution. The resulting water layer was drawn off and washed with benzene. The organic layers were combined and distilled, yielding 83 grams of p-benzoylanisole having a boiling point of 175–183° C. at a pressure of 4 millimeters. This yield represents a conversion of 95 per cent based on the weight of anisole consumed. Sixty-four grams of anisole, which could be recycled for further acylation, were recovered.

Example 3

To a mixture of 108 grams (1.0 mole) of anisole and 107 grams (1 mole) of 95 per cent acetic anhydride were added 5 grams of dihydroxyfluoboric acid. The reaction mixture was heated for a period of 3 hours at 100° C. and then treated as in Example 1 to yield 36 grams of p-acetylanisole. This yield represents a conversion of 42 per cent based on the amount of anisole consumed. Forty-six grams of anisole, which could be recycled for further acylation, were recovered.

Example 4

To a mixture of 122 grams (1 mole) of phenetole and 107 grams (1 mole) of 95 per cent acetic anhydride were added 5 grams of concentrated sulfuric acid. The mixture was heated for a period of 6 hours at 100–110° C. After cooling, the reaction mixture was treated as in Example 1 to yield 19 grams of p-acetylphenetole. This yield represents a conversion of 48 per cent, based on the amount of phenetole consumed. Ninety-two grams of phenetole, which could be recycled for further acylation, were recovered.

We claim:

1. A process for nuclear acylation of a phenyl alkyl ether comprising reacting the same with an acylating agent selected from the group consisting of acyl halides and anhydrides of carboxylic acids in the presence of a strong hydroxy inorganic acid of phosphorus.

2. A process for nuclear acylation of a phenyl alkyl ether comprising reacting the same with an acylating agent selected from the group consisting of acyl halides and anhydrides of carboxylic acids in the presence of phosphoric acid.

3. A process for nuclear acylation of a phenyl alkyl ether comprising reacting the same with an acylating agent selected from the group consisting of acyl halides and anhydrides of carboxylic acids in the presence of sulfuric acid.

4. A process for nuclear acylation of a phenyl alkyl ether comprising reacting the same with an acylating agent selected from the group consisting of acyl halides and anhydrides of carboxylic acids in the presence of from about 0.1 to about 10 per cent by weight of phosphoric acid.

5. A process for nuclear acylation of a phenyl alkyl ether comprising reacting the same with an acylating agent selected from the group consisting of acyl halides and anhydrides of carboxylic acids in the presence of from about 0.1 to about 10 per cent by weight of sulfuric acid.

6. A process for nuclear acylation of anisole comprising reacting the same with an acylating agent selected from the group consisting of acyl halides and anhydrides of carboxylic acids in the presence of phosphoric acid.

7. A process for nuclear acylation of a phenyl alkyl ether comprising reacting the same with an acylating agent selected from the group consisting of acyl halides of carboxylic acids and anhydrides of carboxylic acids at a temperature between about 0° C. and about 150° C. for a period of from 1 to 10 hours in the presence of between about 0.1 and about 10 per cent by weight of phosphoric acid.

8. A process for nuclear acylation of a phenyl alkyl ether comprising reacting the same with an acylating agent selected from the group consisting of acyl halides of carboxylic acids and anhydrides of carboxylic acids at a temperature between about 0° C. and about 150° C. for a period of from 1 to 10 hours in the presence of between about 0.1 and about 10 per cent by weight of sulfuric acid.

9. A process for nuclear acylation of a phenyl alkyl ether comprising reacting the same with an acylating agent selected from the group consisting of acyl halides and anhydrides of carboxylic acids in the presence of an acid selected from the group consisting of sulfuric acid and the strong hydroxy acids of phosphorus.

10. A process for nuclear acylation of anisole comprising reacting the same with an acylating agent selected from the group consisting of acyl halides and anhydrides of carboxylic acids in the presence of an acid selected from the group consisting of sulfuric acid and the strong hydroxy acids of phosphorus.

11. A process for nuclear acylation of phenetole comprising reacting the same with an acylating agent selected from the group consisting of acyl halides and anhydrides of carboxylic acids in the presence of an acid selected from the group consisting of sulfuric acid and the strong hydroxy acids of phosphorus.

12. A process for nuclear acylation of phenetole comprising reacting the same with an acylating agent selected from the group consisting of acyl halides and anhydrides of carboxylic acids in the presence of sulfuric acid.

HOWARD D. HARTOUGH.
ALVIN I. KOSAK.

REFERENCES CITED

The following references are of record in the file of this patent:

UNITED STATES PATENTS

| Number | Name | Date |
|---|---|---|
| 1,717,424 | Schickh | June 18, 1929 |
| 2,109,340 | Nieuwland et al. | Feb. 22, 1938 |
| 2,225,651 | McNally et al. | Dec. 24, 1940 |
| 2,346,926 | Lieber | Apr. 18, 1944 |
| 2,369,691 | Schmerling | Feb. 20, 1945 |

OTHER REFERENCES

Schneider et al.: Berichte, vol. 69B, pages 2543–2557 (1936).

Ciusa et al.: Chemical Abstracts, vol. 38, pages 5793–5794 (1944).